United States Patent
Feldstein et al.

(10) Patent No.: US 9,405,395 B2
(45) Date of Patent: Aug. 2, 2016

(54) WALL-MOUNTED CONTROL SYSTEM FOR A PORTABLE TOUCH SCREEN DEVICE

(75) Inventors: George Feldstein, Cresskill, NJ (US); Mark Labosco, New City, NY (US); Timothy Wickham, Tappan, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 10 days.

(21) Appl. No.: 13/238,229

(22) Filed: Sep. 21, 2011

(65) Prior Publication Data

US 2012/0068832 A1 Mar. 22, 2012
US 2015/0109211 A9 Apr. 23, 2015

Related U.S. Application Data

(63) Continuation of application No. 29/367,201, filed on Aug. 4, 2010, now Pat. No. Des. 650,784.

(60) Provisional application No. 61/385,211, filed on Sep. 22, 2010.

(51) Int. Cl.
| | |
|---|---|
| *G05B 11/01* | (2006.01) |
| *G06F 3/041* | (2006.01) |
| *F16M 11/04* | (2006.01) |
| *F16M 13/00* | (2006.01) |
| *F16M 13/02* | (2006.01) |
| *G06F 1/16* | (2006.01) |
| *G08C 17/02* | (2006.01) |

(52) U.S. Cl.
CPC .......... *G06F 3/0416* (2013.01); *F16M 11/041* (2013.01); *F16M 13/00* (2013.01); *F16M 13/02* (2013.01); *G06F 1/1626* (2013.01); *G06F 1/1632* (2013.01); *G08C 17/02* (2013.01)

(58) Field of Classification Search
CPC .............................. F16M 11/041; G06F 1/1632
USPC ............ 340/12.5, 12.51, 12.52, 12.53, 12.54, 340/12.55, 12.22, 13.24; 710/73, 300, 105, 710/303, 304, 218; 361/681, 679.41, 361/679.42, 679.43, 679.55
See application file for complete search history.

(56) References Cited

U.S. PATENT DOCUMENTS

| | | | |
|---|---|---|---|
| 8,296,493 B1* | 10/2012 | Engelhardt et al. ........... 710/303 |
| 2003/0214602 A1* | 11/2003 | Battles et al. .................. 348/375 |
| 2007/0086151 A1* | 4/2007 | Oh ........................ F16M 11/041 361/679.01 |
| 2008/0232049 A1* | 9/2008 | Takizawa ....................... 361/681 |
| 2008/0247141 A1* | 10/2008 | Kendall ................ F25D 23/028 361/729 |
| 2009/0174998 A1* | 7/2009 | Struthers et al. ......... 361/679.41 |
| 2010/0217912 A1* | 8/2010 | Rofougaran ................... 710/304 |
| 2011/0167181 A1* | 7/2011 | Minoo et al. ..................... 710/73 |
| 2011/0222238 A1* | 9/2011 | Staats et al. .............. 361/679.55 |
| 2012/0033375 A1* | 2/2012 | Madonna et al. ......... 361/679.43 |

* cited by examiner

*Primary Examiner* — Nabil Syed
(74) *Attorney, Agent, or Firm* — Crestron Electronics, Inc (57) ABSTRACT

Presented is a wall-mounted control system for a portable touch screen device. The control system includes a housing, a touch screen mounting member moveably coupled to the housing and configured to releasably hold the portable touch screen device, a processor configured for providing an interface between the portable touch screen device and one or more remote systems, a docking connector configured for electrically mating with the portable touch screen device and establishing electrical communication between the processor and the portable touch screen device, and a communication circuitry configured for establishing communication between the processor the one or more remote systems.

3 Claims, 9 Drawing Sheets

WALL-MOUNTED CONTROL SYSTEM FOR A PORTABLE TOUCH SCREEN DEVICE

CROSS REFERENCE TO RELATED APPLICATIONS

This application is a continuation of U.S. patent application Ser. No. 29/367,201, filed Aug. 4, 2010. This application also claims priority to and the benefit of U.S. Provisional Patent Application Ser. No. 61/385,211, filed on Sep. 22, 2010, the entirety of which is incorporated herein by reference.

BACKGROUND OF THE INVENTION

1. Technical Field

The present invention relates generally to portable hand-held electronic touch screen devices such as smart phones, electronic book readers, and tablet computers, and more particularly to wall-mounting such devices, integrating such devices with various control and automation systems, and augmenting these devices with various external manual hard buttons and/or actuators and/or indicators.

2. Background Art

In the field of control and automation, custom designed and programmed wall-mounted touch panels provide a sophisticated means for interfacing and controlling home theater, lighting, environmental, and security systems. However, such custom wall-mounted touch panels are very expensive in comparison to the various commercially available mass-produced portable hand-held electronic touch screen devices, such smart phones, electronic book (eBook) readers, and tablet computers.

Many such touch screen devices employ a touch screen interface along with generic manual controls and/or actuators, while other smart touch screen devices employ a touch screen interface alone. Further, these smart touch screen devices are capable of executing various third-party applications (i.e., computer programs) that perform a variety of functions (e.g., play music, show video, etc.). However, these smart touch screen devices are not wall-mountable and do not readily interface with, and control, home theater, lighting, environmental, and/or security systems.

Consequently, there exists a need for a system that enables any of the inexpensive commercially available mass-produced hand-held electronic touch screen devices to be removeably mounted to a wall and interface with, and control, home theater, lighting, environmental, and/or security systems.

SUMMARY OF THE INVENTION

It is to be understood that both the general and detailed descriptions that follow are exemplary and explanatory only and are not restrictive of the invention.

DISCLOSURE OF INVENTION

In one aspect, the invention involves a wall-mounted control system for a portable touch screen device. The control system includes a housing, a touch screen mounting member moveably coupled to the housing and configured to releasably hold the portable touch screen device, a processor configured for providing an interface between the portable touch screen device and one or more remote systems, a docking connector configured for electrically mating with the portable touch screen device and establishing electrical communication between the processor and the portable touch screen device, and a communication means configured for establishing communication between the processor the one or more remote systems.

In one embodiment, the control system further includes a plurality of hard buttons, wherein at least one of the plurality of hard buttons is configured for use with an application program executing on the portable touch screen device and at least another one of the plurality of hard buttons is configured to execute a fixed function associated with an external device.

In another embodiment, the communication means includes at least one of a wired Ethernet connection, a wireless Ethernet connection, and a wireless Zigbee connection. In still another embodiment, the communication means further comprises Bluetooth, infiNET, or a proprietary protocol in the ultra high frequency band.

In yet other embodiments, the control system further includes a microphone, at least one speaker, a camera, an authentication coprocessor, circuitry configured for charging a battery disposed in the portable touch screen device, at least one indicator light, a light emitting diode display or a liquid crystal display, and audio and video interfaces configured for transmitting and receiving audio and video.

In still another embodiment, the one or more remote systems include at least one of a home automation system, a home theater system, a lighting system, an environmental control system, or a security system.

In another aspect, the invention involves a wall-mounted control system for a portable touch screen device. The control system includes a housing, a touch screen mounting member moveably coupled to the housing and configured to releasably hold the portable touch screen device, a processor configured for executing a program for interfacing with the portable touch screen device and for controlling and interfacing with one or more remote systems, a docking connector configured for electrically mating with the portable touch screen device and establishing electrical communication between the processor and the portable touch screen device, a communication means configured for establishing communication between the processor the one or more remote systems, and a plurality of hard buttons, at least one of the plurality of hard buttons being configured for use with an application program executing on the portable touch screen device and at least another one of the plurality of hard buttons being configured to execute a fixed function associated with an external device or system.

In still another aspect, the invention involves a wall-mounted control system for a portable touch screen device. The control system includes a housing, a touch screen mounting member moveably coupled to the housing and configured to releasably hold the portable touch screen device, a processor configured for providing an interface between the portable touch screen device and one or more remote systems, a docking connector configured for electrically mating with the portable touch screen device and establishing electrical communication between the processor and the portable touch screen device, a communication means configured for establishing communication between the processor the one or more remote systems, the communication means comprising at least one of a wired Ethernet connection, a wireless Ethernet connection, and a wireless Zigbee connection, and a plurality of hard buttons, at least one of the plurality of hard buttons being configured for use with an application program executing on the portable touch screen device and at least another one of the plurality of hard buttons being configured to execute a fixed function associated with an external device or system.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

The following is a list of the major elements in the drawings in numerical order.
100 wall-mounted control system
102 housing/chassis
104 touch screen mounting member
106 docking connector
108 connector
110 upper track
112 lower track
114 bezel
116 upper groove
118 lower groove
302 pin/rod
402 portable hand-held touch screen device
404 touch screen frame
406 touch screen
408 docking connector
602 processor
604 memory
606 power circuitry
608 data/control lines
610 Ethernet
612 power line
702 bezel/frame
704 indicator lights
706 hard buttons
708 hard buttons
710 thumb pad (hard buttons)
712 hard buttons
714 speaker
716 microphone
718 camera
802 processor
804 memory
806 authentication processor
808 Zigbee interface
810 Wi-Fi interface
812 Zigbee antenna
814 Wi-Fi antenna
900 wall-mounted control system with tablet computer
902 home automation system
904 Internet
906 personal computer
908 remote control device
910 wireless Wi-Fi gateway
912 wireless Zigbee gateway
914 keypad
920 lighting equipment
922 HVAC equipment
924 security equipment
926 home theater
928 home audio

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves a wall-mounted control system for a portable hand-held electronic touch screen device. The wall-mounted control system enables the portable hand-held electronic touch screen device to be removeably mounted to a wall and interface with, and control, home automation, home theater, lighting, environmental, and/or security systems In various embodiments, the wall-mounted control system also augments a portable hand-held electronic touch screen device with various external manual hard buttons and/or actuators and/or indicators.

The wall-mounted control system including the portable hand-held electronic touch screen device is capable of transmitting control commands to a plurality of controllable devices, such as audio and video components, lighting controls, and HVAC controls. In one embodiment, the wall-mounted control system transmits control commands independent of whether or not the hand-held electronic touch screen device is on, or a particular application is executing on the hand-held electronic touch screen device. In another embodiment, the hand-held electronic touch screen device executes an application that complements the intended end-use of the wall-mounted control system, such as a graphic user interface that functions as a control panel for an office or home automation system or home theater.

The wall-mounted control system, in various embodiments, utilizes communication methods known in the art to transmit control commands (e.g., key/button presses) either directly to the controllable devices or indirectly through an intermediate device. For example, the wall-mounted control system may transmit control commands through wired connections or wireless radio frequency (RF) signals.

Figure 1:
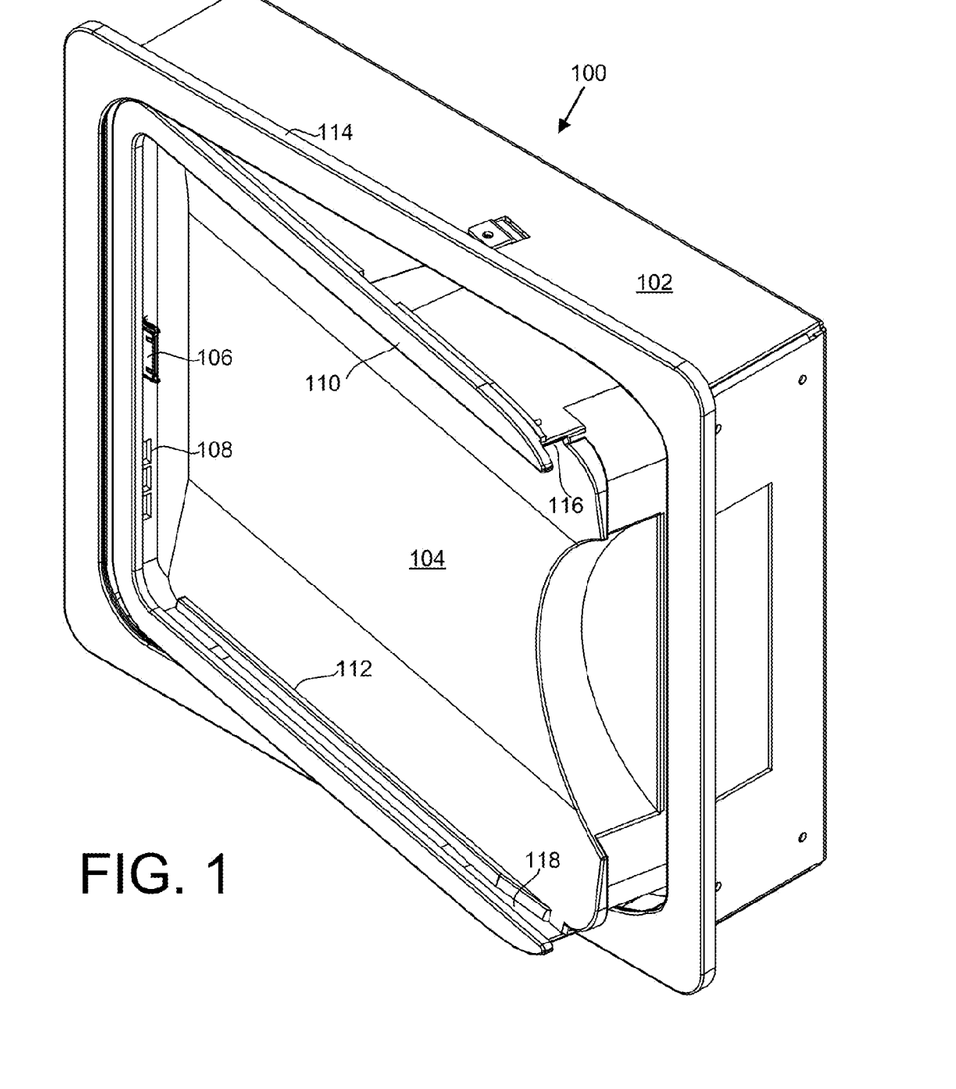
FIG. 1 is an illustrative isometric view of an open wall-mounted control system for a touch screen device, according to one embodiment of the invention.
Figure 2:
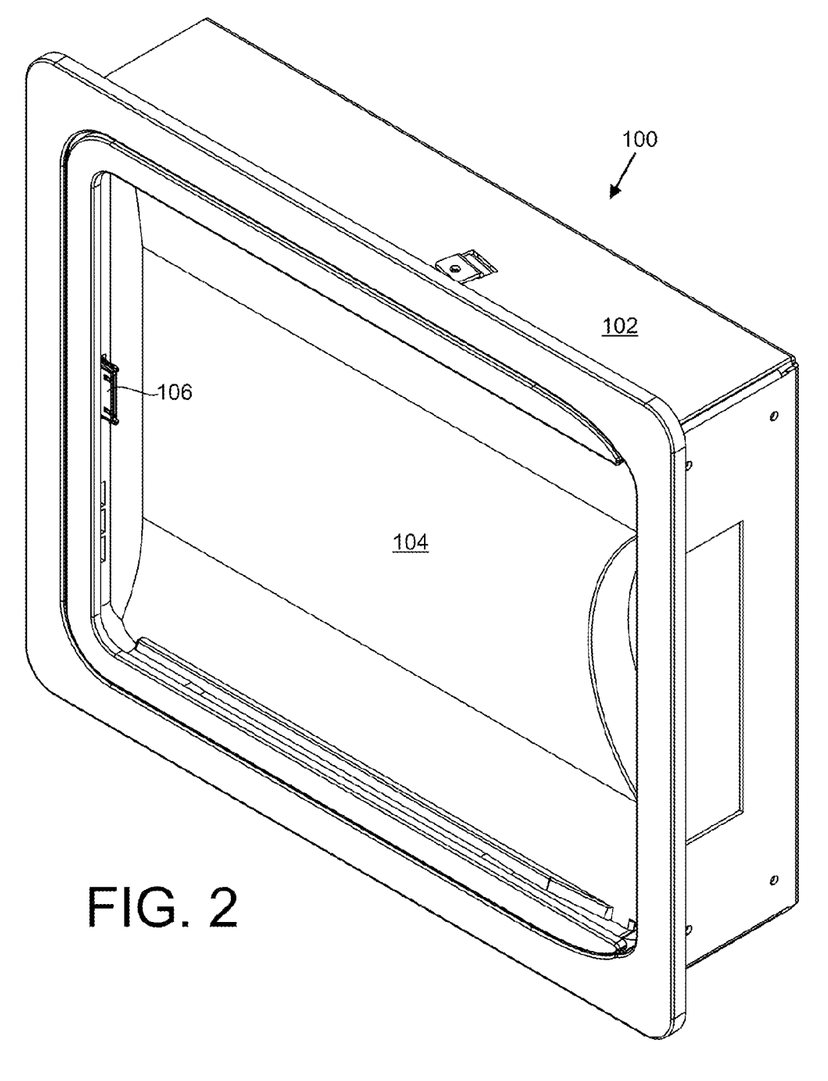
FIG. 2 is an illustrative isometric view of a closed wall-mounted control system for a touch screen device, according to one embodiment of the invention.
Figure 3:
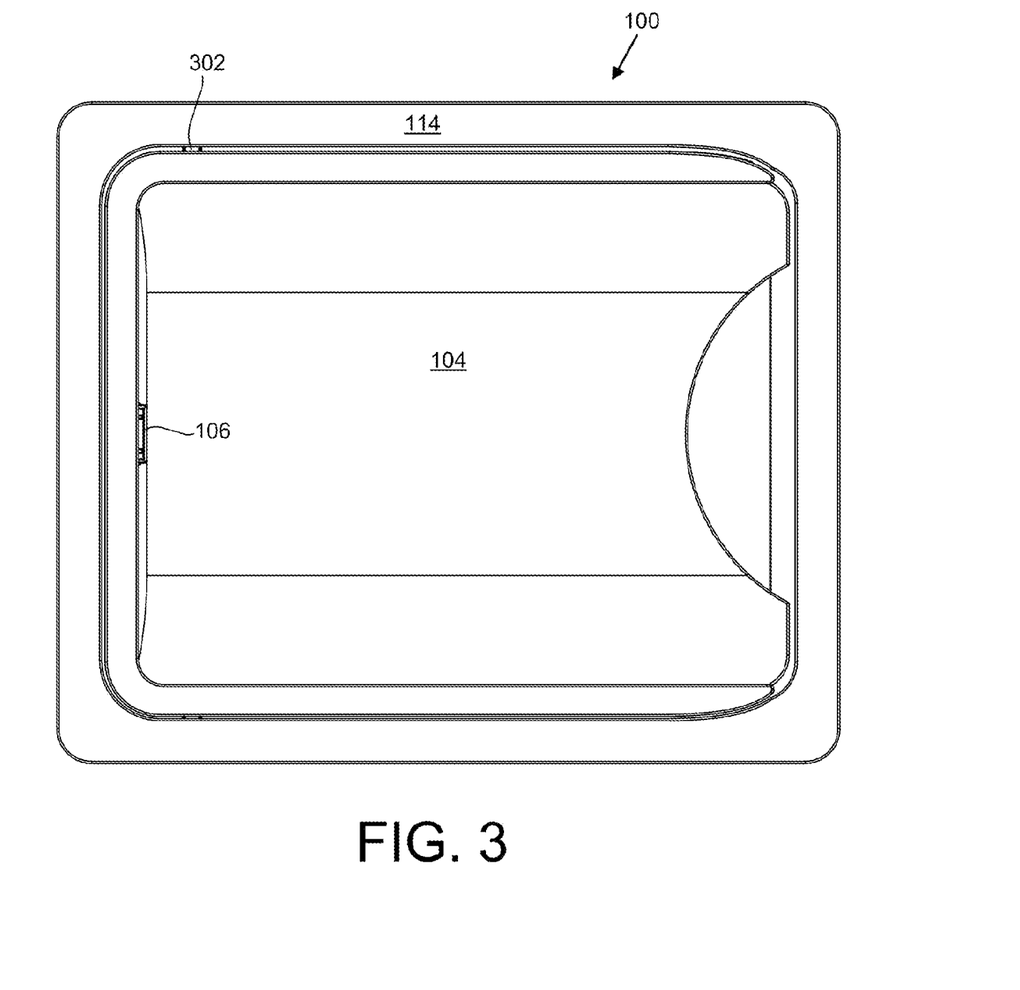
FIG. 3 is an illustrative orthographic front view of a wall-mounted control system for a touch screen device, according to one embodiment of the invention.

Referring to FIGS. 1-3, in one embodiment, illustrative isometric and orthographic views of the wall-mounted control system 100 are shown. The control system 100 includes a housing or chassis 102, a bezel/frame 114, and a touch screen mounting member 104. The touch screen mounting member 104 includes an upper track 110 with an upper groove 116 and lower track 112 with a lower groove 118. The touch screen mounting member 104 further includes a docking connector 106 and one or more auxiliary connectors 108, such as Audio/Video, Ethernet, or phone. In various embodiments, the control system 100 is constructed of plastic, metal (e.g., stainless steel, aluminum), fiberglass, or other acceptable material known to those skilled in the art.

The housing 102 is configured to be disposed inside a wall of a room and anchored to, or supported by, a wall stud, similar to a light switch or outlet box. The bezel 114 is configured to lay flush against the wall surface, similar to a face plate of light switch. The housing 102 includes at least one opening dimensioned and arranged to accommodate various cables (routed through the wall), such as power, Ethernet, audio/video, and phone, to pass therethrough and internally connect to docking connector 106 and/or connectors 108.

The touch screen mounting member 104 is moveable between an open position (FIG. 1) and a closed position (FIG. 2) by various means known to those skilled in the art. For example, in one embodiment, the mounting member 104 is moved from the closed position (FIG. 2) to the open position (FIG. 1) when the mounting member 104 is pushed inward (into the housing) and released. This motion actuates a two position spring member (not shown), which in response to being pushed in, moves from a first position to a second position and thereby pushes the mounting member 104, which rotates on pin/rod 302 to the open position. To move the mounting member 104 back to the closed position, the mounting member 104 is again pushed inward against the outward force of the spring member until the spring member moves back from the second position into the first position.

The mounting member 104 is dimensioned to receive and hold a particular hand-held touch screen device. In other words, in one embodiment, the upper track 110 with the upper groove 116 and the lower track 112 with the lower groove 118 are dimensioned to receive and hold a particular size smart phone. Further, the connectors 106, 108 are configured to electrically mate with one or more connectors disposed on the particular smart phone. In another embodiment, the upper track 110 with the upper groove 116 and the lower track 112 with the lower groove 118 are dimensioned to receive and hold a particular size tablet computer. Further, the connectors 106, 108 are configured to electrically mate with one or more connectors disposed on the particular tablet computer.

In another embodiment, the mounting member 104 includes various speaker openings. The speaker openings are located proximate to a speaker of the particular touch screen device that is disposed in the mounting member 104. The speaker openings prevent sound emanating from the speaker of the particular touch screen device from being blocked and muffled.

Figure 4:
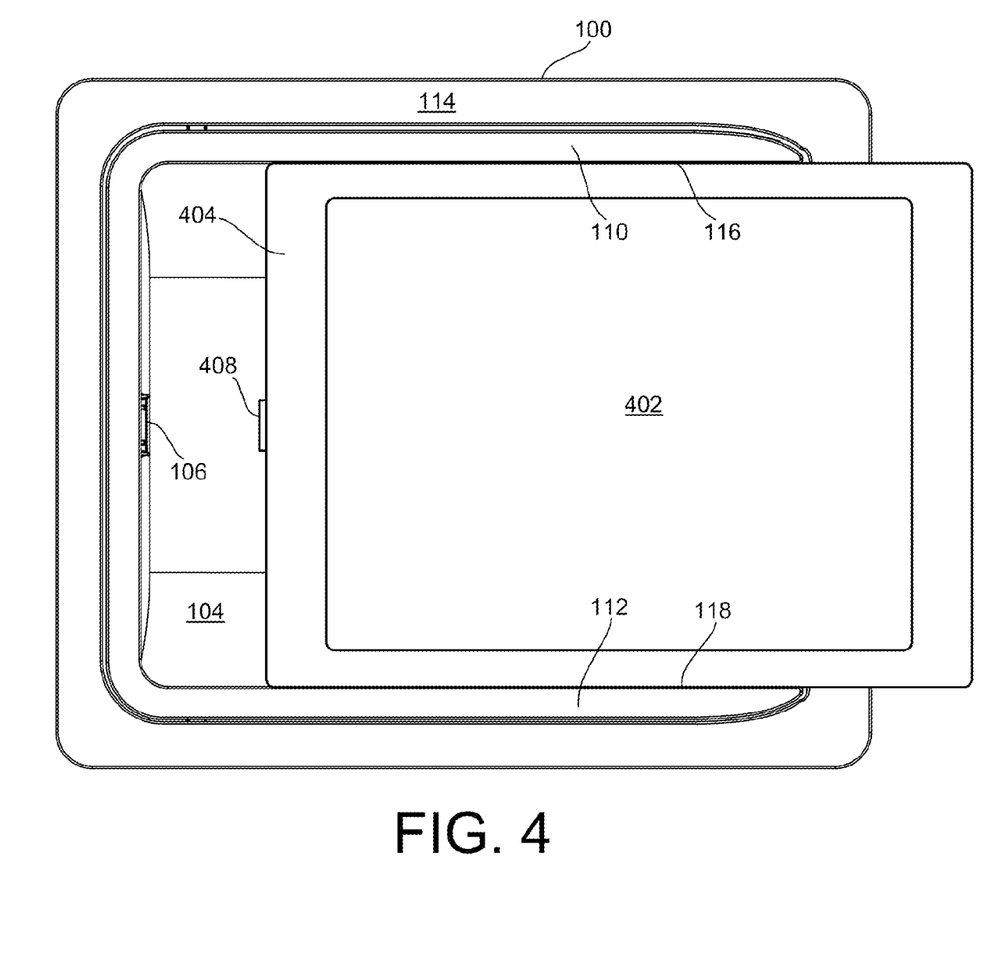
FIG. 4 is an illustrative orthographic front view of the wall-mounted control system of FIG. 3 including a portable touch screen device partially disposed therein, according to one embodiment of the invention.
Figure 5:
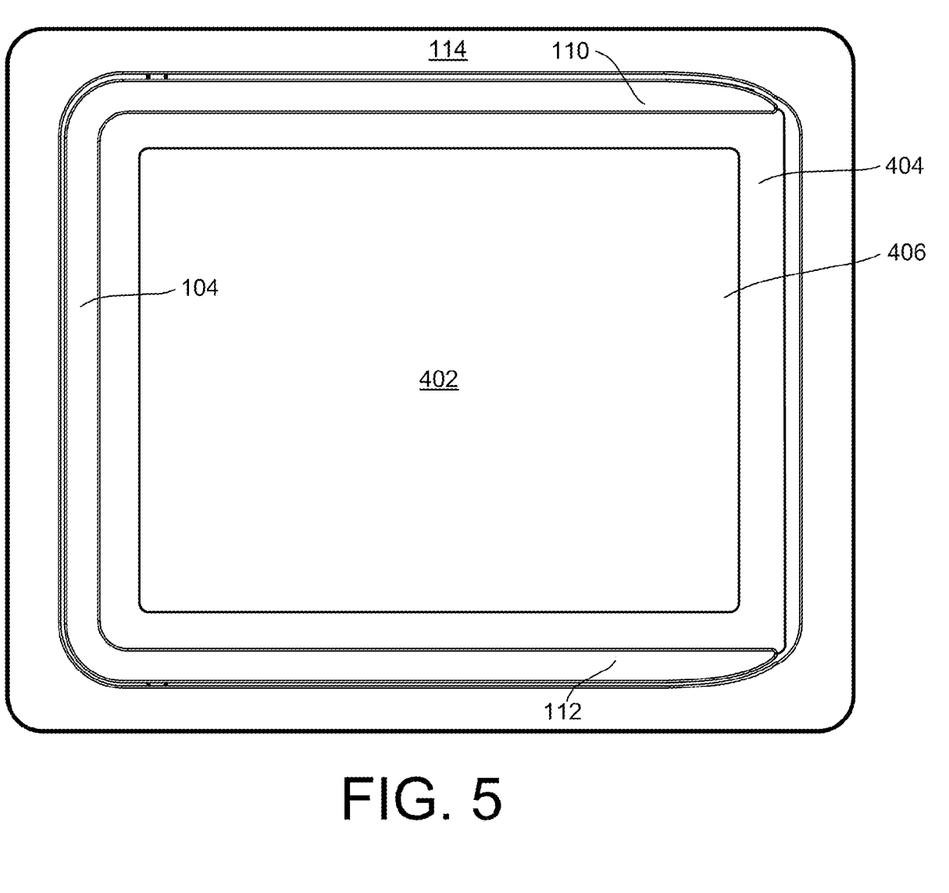
FIG. 5 is an illustrative orthographic front view of the wall-mounted control system of FIG. 3 including a portable touch screen device completely disposed therein, according to one embodiment of the invention.

FIGS. 4 and 5 are illustrative orthographic front views of the wall-mounted control system of FIG. 3 including a portable hand-held touch screen device 402 partially and completely disposed therein. The portable hand-held touch screen device 402 includes a frame 404 and screen 406. Referring to FIGS. 1, 2, 4, and 5, in one embodiment, in operation, a user moves the mounting member 104 from the closed position (see FIG. 2) to the open position (see FIG. 1) as described above. The user then takes an appropriately sized portable touch screen device 402 and orients the touch screen device 402 so that a connector 408 on the touch screen device 402 is positioned to mate with the docking connector 106. The user then inserts and slides opposite edges of the frame 404 of the touch screen device 402 (i.e., edges that are perpendicular to the edge with the connector 408) into the upper groove 116 of the upper track 110 and the lower groove 118 of the lower track 112 (see FIG. 4). The user then pushes the touch screen device until the connector 408 electrically mates with the docking connector 106 (see FIG. 5). In other embodiments, the touch screen device 402 includes additional connectors proximate to connector 408 that mate with connectors 108. After the connector 408 is electrically mated with the docking connector 108, and the touch screen device 402 is fully inserted into the mounting member 104, the user moves the mounting member from the open position (FIG. 1) to the closed position (FIG. 2), as described above.

If the user wishes to remove the touch screen device 402 from the control system 100, the user simply moves the mounting member 104 to the open position as described above, and pulls the touch screen device 402 in the direction opposite to the direction of insertion until the touch screen device 402 disengages the connector 106 and slides out of the upper and lower tracks 110, 112.

In various embodiments, the housing 102 includes therein various electronic circuitry that is necessary to connect the touch screen device 402 disposed in the touch screen mounting member 104 (and mated to the docking connector 106) to a home automation system, security system, and/or home entertainment system.

Figure 6:
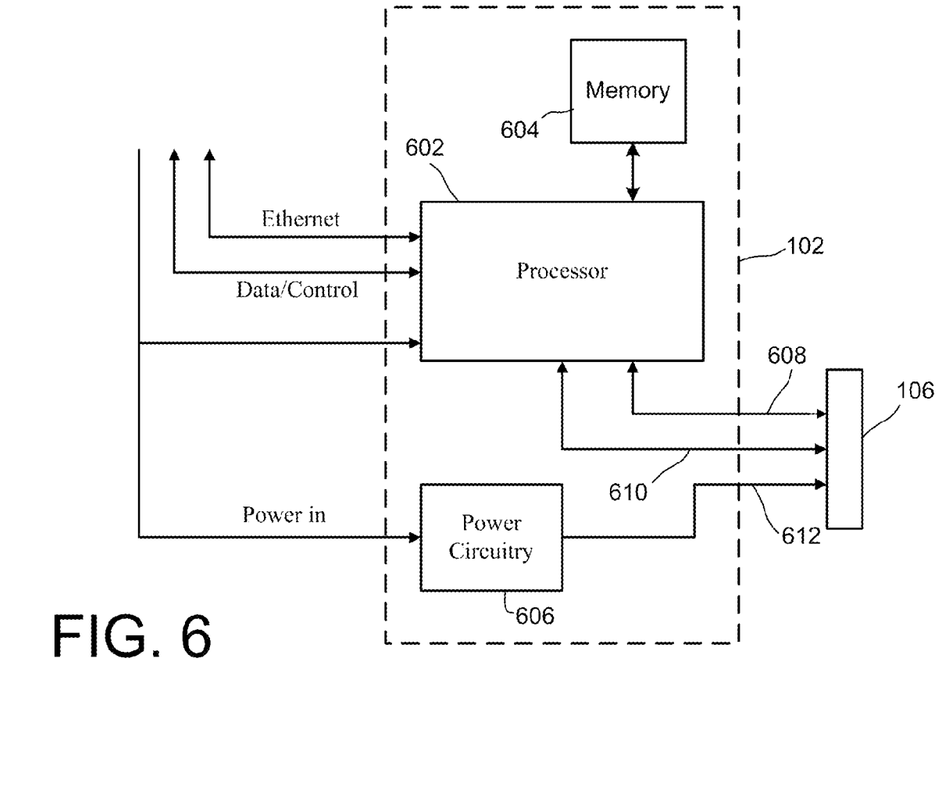
FIG. 6 is an illustrative block diagram of the electronic components disposed in the wall-mounted control system, according to one embodiment of the invention.

Referring to FIG. 6, in one embodiment, a block diagram of the electronic components and circuitry disposed in the housing 102 is shown. In this embodiment, the housing 102 includes a processor 602, a memory 604 (e.g., RAM, ROM, EPROM), and power circuitry 606.

The processor 602 functions as the interface between the touch screen device 402 and any systems that the touch screen device 402 is intended to control or interface with. The processor 602 is in communication with the memory 604 and the docking connector 106. The processor 602 receives "power in" from the house or building power. The processor 602 also connects (wired) to a home or building network (e.g., Ethernet or Cresnet®). The processor 602 also receives (wired) other data/control signals, such as audio/video data, from one or more external sources.

The memory 604 is configured for storing various data, such as login/password information, user profiles, and/or user environment settings, for example. The memory 604 is also configured for storing executable programs that are either executed on the processor 602, or download to and executed on the touch screen device 402.

As mentioned above, the touch screen mounting member 104 includes a docking connector 106. The docking connector 106 is configured for electrically connecting/mating to a connector (not shown) disposed on the touch screen device 402 and enables a communication and power transfer path between the circuitry in the housing 102 and the touch screen device 402.

Still referring to FIG. 6, the docking connector 106 includes connections for data/control 608 and network communications 610 to/from the processor 602. Such connections between the processor 602 and the docking connector 106 include a CAN bus, Ethernet, Cresnet®, IEEE-1394 (Firewire), RS-232, RS-422, RS-485, and/or USB, or other device specific or proprietary communication protocols. The docking connector 106 also includes a power connection 712 from power circuitry 606. In one embodiment, the power circuitry 606 includes circuitry to convert house/building line power to the appropriate voltage for powering the particular touch screen device 402. In another embodiment, the power circuitry 606 also includes circuitry for charging a battery of the particular touch screen device 402. In still other embodiments, power to the control system 100 and an attached touch screen device 402 is provided through power over Ethernet (POE) circuitry.

Figure 7:
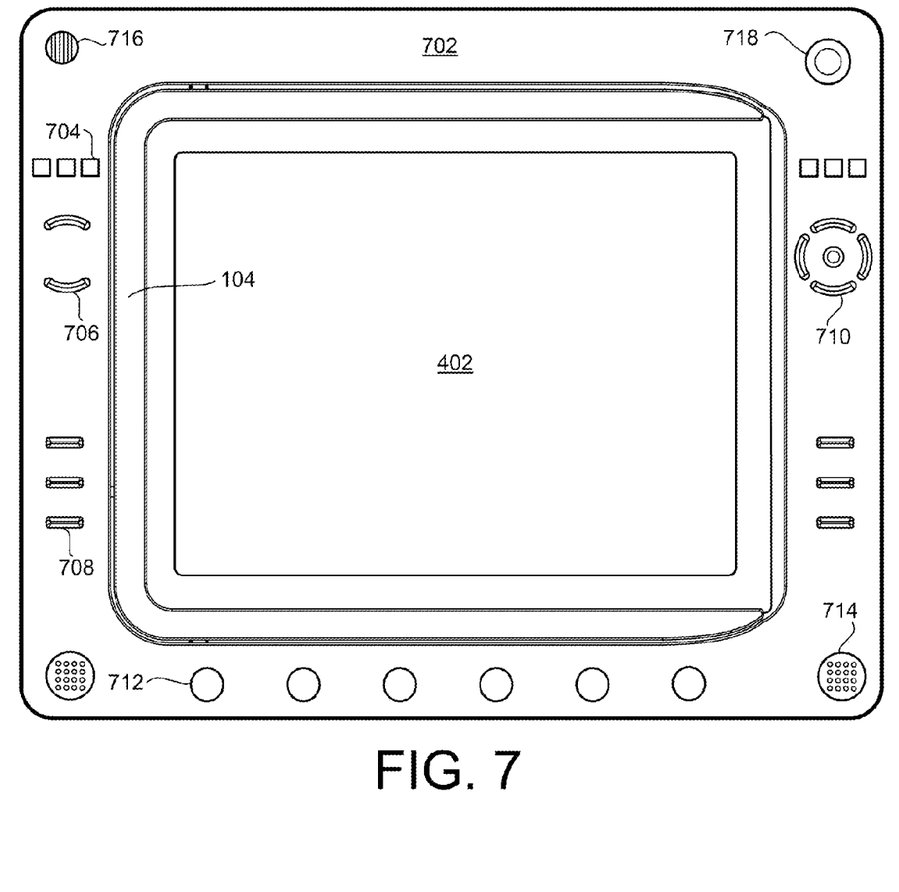
FIG. 7 is an illustrative orthographic front view of a wall-mounted control system that includes various hard buttons, according to another embodiment of the invention.

Referring to FIG. 7, in another embodiment, the wall mounted control system includes bezel/frame 702 in place of frame 114 (see FIG. 3). The bezel/frame 702 includes hard buttons 706, 708, 710, 712, indicator lights 704, a microphone 716, speakers 714, and camera 716. In other embodiments, the frame 702 also includes an LED or LCD display, and additional connectors such as USB, or A/V connectors. In yet other embodiments, the frame 702 includes one or more optical finger navigation buttons and/or trackballs. In still other embodiments, more or less hard buttons and indicator lights are included.

Figure 8:
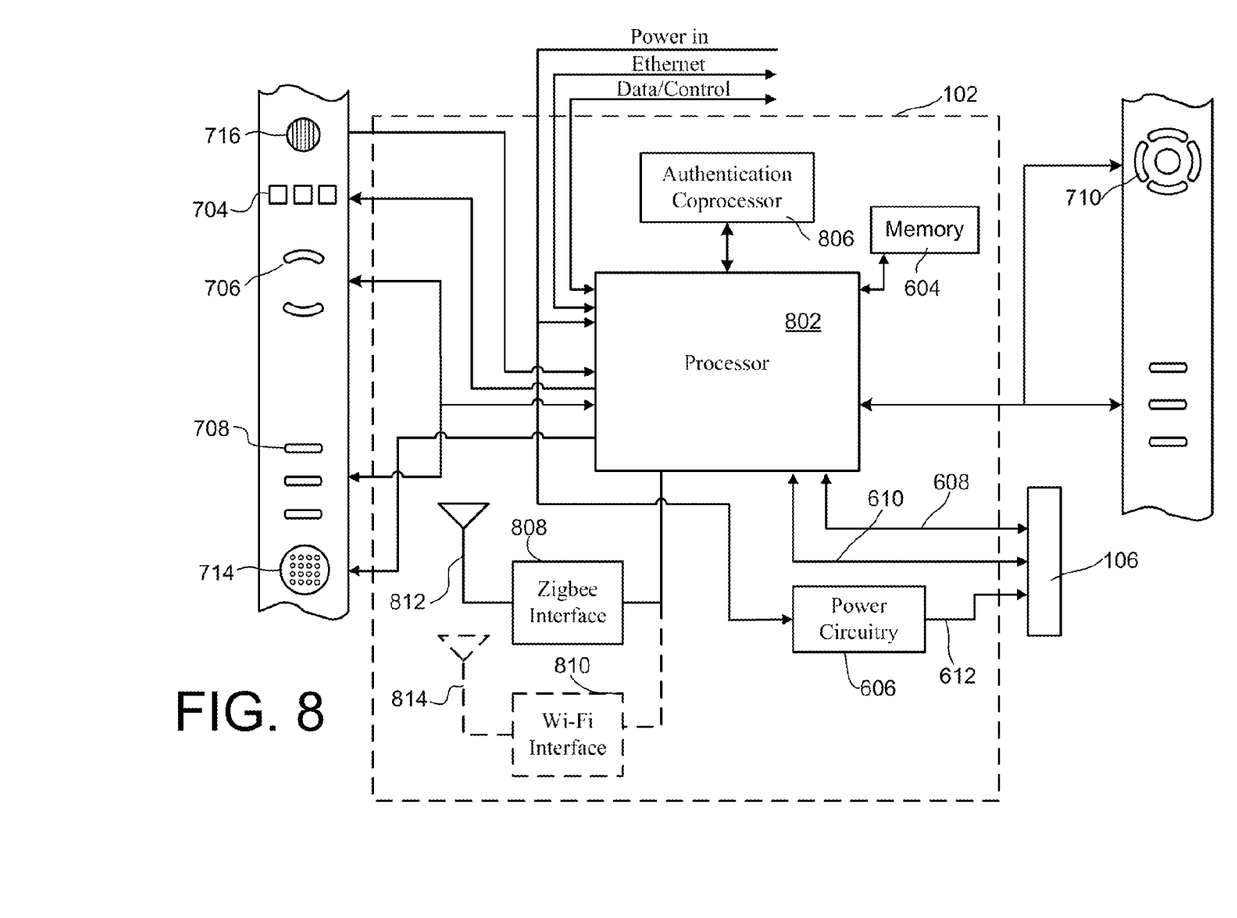
FIG. 8 is an illustrative block diagram of the electronic components disposed in the wall-mounted control system, according to another embodiment of the invention.

Referring to FIG. 8, in another embodiment, a block diagram of additional/alternative electronic components and circuitry disposed in the housing 102 is shown. In this embodiment, the components and circuitry include a processor 802, the memory 604, and the power circuitry 606.

The processor 802 functions as the interface between the touch screen device 402 and any systems that the touch screen device 402 is intended to control or interface with. The processor 802 includes general purpose input/output (GPIO) interfaces that are in communication with the hard buttons 706, 708, 710, 712. The processor 802 is also in communication with, and controls, the indicator lights 704. The processor 802 is also configured to receive signals from the microphone 716 and the camera 718, and transmit signals to the speakers 714.

The processor 802 is also in communication with the memory 604 and the docking connector 106. The processor 802 receives "power in" from the house or building power. In various embodiments, the processor 802 also connects (either wired or wirelessly) to a home or building network, such as Ethernet or Cresnet®. The processor 802 also receives and/or transmits (either wired or wirelessly) other data/control signals, such as audio/video data from external sources.

The memory 604 is configured for storing various data, such as login/password information, user profiles, and/or user environment settings, for example. The memory 604 is also configured for storing executable programs that are either executed on the processor 802, or download to and executed on the touch screen device 402. In other embodiments, the processor 802 includes an on-board memory.

As mentioned above, the touch screen mounting member 104 includes a docking connector 106. The docking connector 106 is configured for electrically connecting/mating to a connector (not shown) disposed on the touch screen device 402 and enables a communication and power transfer path between the circuitry in the housing 102 and the touch screen device 402.

Still referring to FIG. 8, the docking connector 106 includes connections for data/control 608 and network communications 610 to/from the processor 802. Such connections between the processor 802 and the docking connector 106 include a CAN bus, Ethernet, Cresnet®, IEEE-1394 (Firewire), RS-232, RS-422, RS-485, and/or USB. The docking connector 106 also includes a power connection 612 from power circuitry 606. In one embodiment, the power circuitry 606 includes circuitry to convert house/building line power to the appropriate voltage for powering the particular touch screen device 402. In another embodiment, the power circuitry 606 includes circuitry for charging a battery of the particular touch screen device 402. In still other embodiments, power to the control system 100 and an attached touch screen device 402 is provided through power over Ethernet (POE) circuitry.

The components and circuitry disposed inside the housing 102 still further include either a Zigbee (IEEE-802.15.4) interface 808 and associated antenna 812 or a Wi-Fi (IEEE-802.11) interface 810 and associated antenna 814 in communication with the processor 802, which enable the processor 802 to wirelessly connect to a home or building network (e.g., Ethernet or Cresnet®), and to transmit and receive various data and control signals, such as audio/video data, for example. In other embodiments, the processor 802 is configured to wirelessly communicate with external devices using Bluetooth (IEEE-802.15.1), infiNET™, and/or a proprietary protocol in the ultra high frequency band.

Also disposed inside the housing 102 and in communication with the processor 802 is an authentication processor 806, which is an encryption chip licensed from Apple, Inc., that is included in devices that are officially licensed to communicate with Apple® products. Consequently, if the touch screen device 402 were an Apple® iPad™ or Apple® iPod™, then the wall-mounted control system disclosed herein would need an authentication coprocessor 402 to function correctly with the iPad or iPod. In operation, after the touch screen device 402 (i.e., iPad) was inserted into the mounting member 104 and mated with the docking connector 106, the touch screen device 402 would interrogate the wall-mounted control system 100 to verify (by communicating with the authentication coprocessor 808) that the control system 100 was a product officially licensed to communicate with the touch screen device 402.

Figure 9:
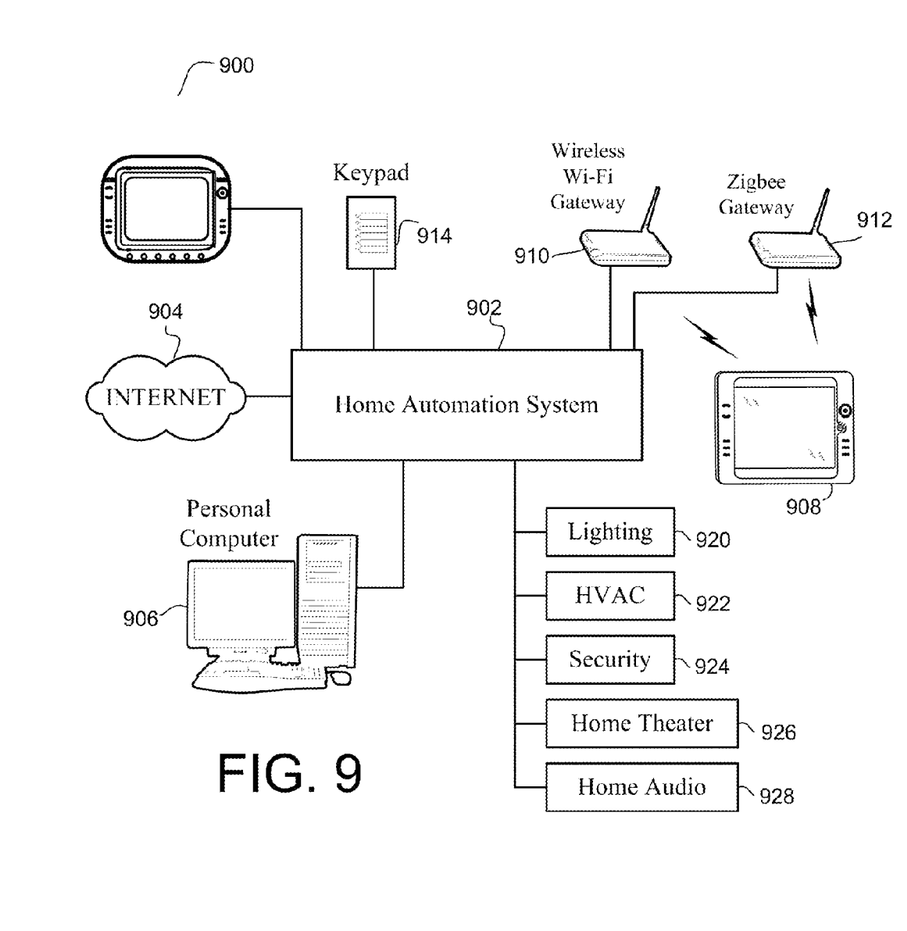
FIG. 9 is an illustrative block diagram of a plurality of devices in communication with a home automation system, according to one embodiment of the invention.

Referring to FIG. 9, in one embodiment, a block diagram of a plurality of devices in communication with a home automation system 902 is shown. The home automation system 902 is in communication with, and controls, lighting 920, HVAC 922, security 924, a home theater system 926, and a home audio system 928. The home automation system 902 can be configured and controlled via a personal computer 906, a keypad 914, a remote control device 908 via a wireless Wi-Fi gateway 910 and/or a wireless Zigbee gateway 912, or the wall-mounted control system (with a touch screen device such as a table computer disposed therein) 900, which is in wired or wireless communication with the home automation system 902.

In some embodiments, the control system 900 can be used to connect to the internet 904 via the home automation system 902 through either wired or wireless communication. In other embodiments the wireless Wi-Fi gateway 910 and the wireless Zigbee gateway 912 are combined into a single wireless gateway device.

Referring to FIGS. 7-9, in one embodiment, one part or component of a software application/program (first application component) for controlling, or interfacing with, a home or office automation system (e.g., automation system 902) is stored in the memory 604 or in a memory on the processor 802 and executes on the processor 802. Additionally, another part or component of the software application (second application component) for controlling, or interfacing with, the automation system 902 resides and executes on the touch screen device 402 disposed in the touch screen mounting member 104. The first and second components of the automation system control application execute independent of any other application that may be executing on the touch screen device 402. Further, the first and second application components execute independently of each other.

The first application component executing on the processor 802 interprets input (actuations) from the hard buttons 606, 608, 610, 612, converts the hard button actuations into digital signals, and transmits the digital signals from the actuated hard button (e.g., pressed) to the touch screen device 402. The processor 802 also transmits the control instructions that correspond to the button actuations to the automation system 902 or to a particular external device in communication with the automation system via a wired or wireless communication link. The first application component also provides the signals that are used to control (i.e., turn on/off) the indicator lights 604.

In various embodiments, at least some of the hard buttons 606, 608, 610, 612 are dedicated control buttons with fixed functions, such as volume up/down, channel up/down, lights on/off, home, guide, info, exit, and/or mute, for example. These hard buttons execute their respective control functions upon being pressed by a user regardless of the state of the touch screen device 402. In other words, these hard buttons execute their respective control functions without the user having to navigate through control menus, or without the touch screen device 402 being involved in any way. The dedicated control buttons of the control system will still execute their assigned/programmed functions even when the touch screen device 402 is not disposed in the touch screen mounting member 104.

Other of the hard buttons 606, 608, 610, 612, are user configurable to control various external devices (e.g., stereo, temperature, light dimmer, etc) and/or system control functions. In some embodiments, one or more of the other hard buttons are programmed to interact with a graphical user interface displayed on the screen 406 of the touch screen device 402, or control another application executing on the touch screen device 402.

The second application component provides the optional graphical user interface displayed on the touch screen device 402, and includes soft buttons used for controlling additional components, devices, and/or functions of the automation system 902. The second application component receives input (digital signals from hard button actuation) from the first application component, as described above. The second application component also transmits input (digital signals from soft button actuation) to the first application component, which in turn transmits the corresponding control instructions to the automation system 902 or to a particular external device in communication with the automation system via a wired or wireless communication link.

In one embodiment, during an initial device configuration and set-up operation, the touch screen device 402 is inserted into the touch screen mounting member 104 and mated with the docking connector 106. The processor 802 then establishes a communication link between the processor 802 and the touch screen device 402. The processor 802 retrieves the second application component from memory 604, on-board processor memory, or from remote storage via the wired or wireless network link. The processor 802 then installs the second application component on the touch screen device 402. In other embodiments, the second application component is installed directly onto the touch screen device 402 by means known to those skilled in the art.

When a user wishes to control a function of a device that is in communication with the automation system 902, such as muting the audio of the home theater 926, for example (see FIG. 9), the user simply presses the appropriate hard button 606, 608, 610, 612 (or soft button of a graphical user interface) that is dedicated to, or programmed for, muting the audio. If a hard button is pressed, the processor 802 executing the first application component captures and transmits (wired or wirelessly) the digital signal corresponding to the mute audio command created by the user pressing the mute hard button to the automation system 902, which in turn transmits the mute audio command to the home theater 926. If a soft button is pressed, the processor of the touch screen device 402 executing the second application component captures and transmits (via docking connector 106) the digital signal corresponding to the mute command to the first application component, which then transmits the digital signal to the automation system 902, which in turn transmits the digital signal to the home theater 926.

Upon receiving the mute audio command, the home theater mutes the audio and transmits a response or status signal to the automation system 902. The automation system 902 then transmits (wired or wirelessly) the response/status signal to the processor 802. The processor 802 uses the received response/status signal to illuminate an indicator light 604 corresponding to audio muting being activated. Alternatively, the first application component executing on the processor 802 transmits the response/status signal to the second application component (executing on the touch screen device 402), which provides an appropriate indicator on the graphical user interface displayed on the touch screen device 402.

In other embodiments, the microphone 616, the speakers 614, and the camera 618 are used for an audio/video intercom system within the home or building. Alternatively, these components can be used for web-based phone calls or video chat. In another embodiment, the camera 618 and microphone 616 are used to remotely surveil the particular room in which the system 100 (and connected touch screen device) are located, as part of a network (wired or wireless) or web based security system.

In yet another embodiment, the control system 100 is configured to stream audio/video from the touch screen device disposed therein. The audio/video from the touch screen device is either accessed by the processor 802 over a connection to a USB port disposed on the touch screen device, over a digital interface such as an HDMI or DisplayPort, or via the docking connector 108. In some embodiments, the processor 802 then encodes the audio/video into an MPEG streaming format, encodes the data steam in accordance with HDCP 2.0, and transmits the audio/video to other remote devices over Ethernet, Wi-Fi, Zigbee, or Cresnet using a protocol such as AVB, or other audio/video transmission protocol known to those skilled in the art. This feature enables the touch screen device to function as an audio/video server or to access online content and stream such content to other remote devices in the house or building.

In still other embodiments, the wall-mounted control system disclosed herein is configured to receive, and establish electrical communication with, a hand-held electronic touch screen device that is disposed within a protective enclosure (e.g., clam shell) that includes at least one or more dedicated hard buttons. Examples of such an enclosure are described in U.S. patent application Ser. No. 12/960,791, and U.S. patent application Ser. No. 13/076,716, the entireties of which are incorporated herein by reference.

LIST OF ACRONYMS USED IN THE DETAILED DESCRIPTION OF THE INVENTION

The following is a list of the acronyms used in the specification in alphabetical order.
AV audio visual
AVB audio video bridging
CAN controller area network (data transfer protocol)
CPU central processing unit
DVD digital video disc
EPROM electronically programmable read only memory
GPIO general purpose input/output
HDCP high-bandwidth digital content protection
HDMI high definition multimedia interface
HVAC heating, ventilation, and air conditioning
$I^2C$ inter-integrated circuit (digital bus)
IEEE Institute of Electrical and Electronics Engineers
PC personal computer
POE power over Ethernet
RAM random access memory
ROM read only memory
SPI serial peripheral interface
UHF ultra-high frequency
USB Universal Serial Bus

ALTERNATE EMBODIMENTS

Alternate embodiments may be devised without departing from the spirit or the scope of the invention. For example, in alternative embodiments the first control button and the second control button may be joysticks.

INDUSTRIAL APPLICABILITY

To solve the aforementioned problems, the present invention is a unique portable smart touch screen device disposed in, and in communication with, a clam shell enclosure that includes one or more dedicated hard buttons, processing, and communications.

What is claimed is:

1. A wall-mounted control system for a portable touch screen device, the control system comprising:
a housing configured for being mounted on a wall;
a touch screen mounting member comprising a first track and a second track parallel to the first track, the first track and the second track each defining a respective opening at one respective end, the first track and the second track being dimensioned and arranged for slideably receiving opposite edges of the portable touch screen device through the respective openings at the respective ends along an axis parallel to the first track and second track, the touch screen mounting member being coupled to the housing and moveable about an axis perpendicular to the first track and second track between a first position disposed in the housing and a second position extending partially out of the housing and configured to releaseably hold the portable touch screen device between the first track and the second track in a position enabling direct physical access to the portable touch screen device when the touch screen mounting member is in either the first position or the second position; and
a docking connector disposed on a wall perpendicular to the first track and the second track and configured for electrically mating with the portable touch screen device.

2. The wall-mounted control system of claim 1, wherein the touch screen mounting member defines a cavity dimensioned and arranged to provide fingertip access to the rear side of the portable touch screen device.

3. The wall-mounted control system of claim 1, further comprising a bezel disposed on the housing.

* * * * *